April 14, 1970     L. F. NIEBERGALL     3,505,876
FILTER EVALUATION EQUIPMENT

Filed Feb. 8, 1968     3 Sheets-Sheet 1

INVENTOR.
Louis F. Niebergall
BY
Harness, Dickey & Pierce
ATTORNEYS

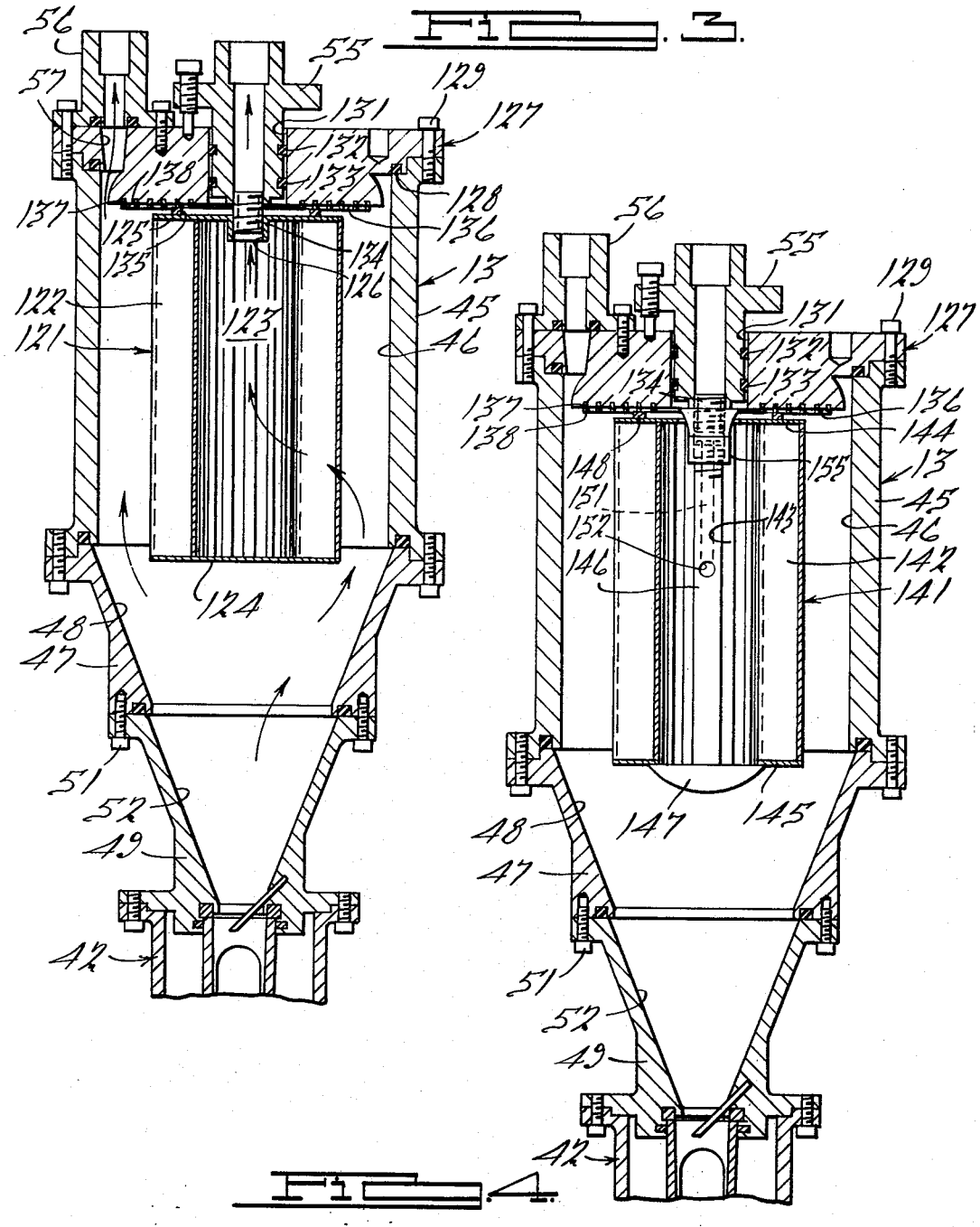

United States Patent Office 3,505,876
Patented Apr. 14, 1970

3,505,876
FILTER EVALUATION EQUIPMENT
Louis F. Niebergall, Racine, Wis., assignor, by mesne assignments, to Tenneco Inc., Houston, Tex., a corporation of Delaware
Filed Feb. 8, 1968, Ser. No. 704,074
Int. Cl. G01n 15/02; B01d 29/00
U.S. Cl. 73—432
13 Claims

ABSTRACT OF THE DISCLOSURE

An apparatus for evaluating both the efficiency and the size of foreign particles removed from a fluid by a fluid filter. The apparatus includes a test housing having a specially formed cavity in which the filter to be tested is positioned and wherein a test fluid is directed through the filter. The special shape of the cavity precludes the settling out of foreign particles from the test fluid to insure against false efficiency readings. After the test fluid has passed through the fluid filter a sensing apparatus determines both the size of the particles remaining in the test fluid and the number of such particles. By continuously recirculating the test fluid through the filter being tested and through the sensing apparatus, instantaneous readings of the filter efficiency and the size of particles removed from the test fluid may be determined.

BACKGROUND OF THE INVENTION

This invention relates to a filter evaluation equipment and a method of evaluating a filter. More particularly, the invention relates to an improved test method and apparatus for evaluating fluid filters to determine their efficiency and the capability of the filter to exclude particles of different sizes.

Several methods and associated apparatuses have been employed for testing fluid filters, such as the oil filters used in conjunction with the lubrication system of an internal combustion engine. In order to provide an accurate comparison between different filters, certain standardized tests also are specified by either the filter manufacturers or the ultimate purchaser of the filters. For the most part, the previously proposed methods and apparatuses for commercially testing such fluid filters have operated a principal wherein the alleged efficiency of the filter is determined by the weight of the foreign particles removed from a test fluid by the filter being tested. That is, in most of these test methods a given weight of foreign particles is added to a test fluid. The test fluid and the entrained foreign particles are then passed through the filter to be tested for a given period of time with a given flow rate. At the end of the duration of the test cycle, the test fluid and remaining entrained foreign particles are passed through an extremely fine filter such as a membrane filter which filter has previously been weighed. The membrane filter is intended to remove all of the remaining foreign particles from the test fluid and after the test fluid has all been passed through this filter the filter is dried and again weighed. The additional weight which the membrane filter has gained is assumed to be the weight of the remaining foreign particles in the test fluid. This weight is subtracted from the initial weight of the foreign particles added to the test fluid and is divided by the initial weight to give a percentage which is considered to be the efficiency of the filter tested.

The aforenoted type of test procedure has several defects. For example, it affords no indication as to the specific size or number of different size particles removed if the foreign particles are not of a uniform size. Since in actual use a filter is normally called upon to filter a flow that contains various size foreign particles and to remove these particles from the fluid, the aforenoted test procedure does not afford an accurate indication of the performance a filter will give in actual use. In one of the standardized tests previously referred to, foreign particles of varying sizes are added to the test fluid. Although this mixture of foreign particles is intended to approximate those encountered in actual filter usage, the use of this mixture of particles in the test procedure still may not give an accurate comparison of different type filters since only a weight comparison is made.

In addition to the aforenoted defect, the test procedures previously employed do not lend themselves to an instantaneous indication of filter efficiency nor do they lend themselves to the plotting of an efficiency versus time use curve without resorting to an averaging procedure. Furthermore, the overall reliability of such test procedures may be subject to question.

It is therefore, the principal object of this invention to provide an improved method and apparatus for testing fluid filters.

It is another object of the invention to provide a test method and apparatus wherein both the size and number of foreign particles removed from a test fluid by a filter may be accurately determined.

It is a further object of this invention to provide a test method and apparatus wherein filter efficiency may be determined with extreme accuracy.

It is yet another object of this invention to provide a filter test method and apparatus that permits accurate comparisons to be made between filters of different types.

BRIEF SUMMARY OF THE INVENTION

A method embodying this invention is particularly adapted for testing the efficiency of a fluid filter. The method comprises the steps of counting the number of foreign particles present in a test fluid, subsequently passing the test fluid containing the foreign particles through a filter to be tested and then counting the number of foreign particles remaining in the test fluid to determine the number of particles removed by the filter.

A test apparatus embodying this invention and adapted to perform the method described in the immediately preceding paragraph includes housing means. The housing means defines a filter test cavity for receiving the filter to be tested, a fluid inlet passage and a fluid outlet passage. The filter to be tested is supported within the filter test cavity in the path of fluid flow from the fluid inlet passage to the fluid outlet passage for removing foreign particles from the test fluid. At least one of the fluid passages is disposed vertically beneath the filter test cavity and the walls of the test cavity adjacent this fluid passage and the walls defining the fluid passage define a relatively smooth downwardly converging flow stream for precluding the settling of the entrained foreign particles out of the test fluid to preclude a false indication of a number of foreign particles removed from the test fluid by the filter.

BRIEF DESCRIPTION OF THE DRAWINGS

FIGURE 3 is an enlarged cross sectional view of the filter test housing shown in FIGURE 2 and illustrating a different embodiment of the invention.

FIGURE 4 is a cross sectional view, in part similar to FIGURE 3, showing another embodiment.

DETAILED DESCRIPTION OF THE PREFERRED EMBODIMENTS

Figure 1:
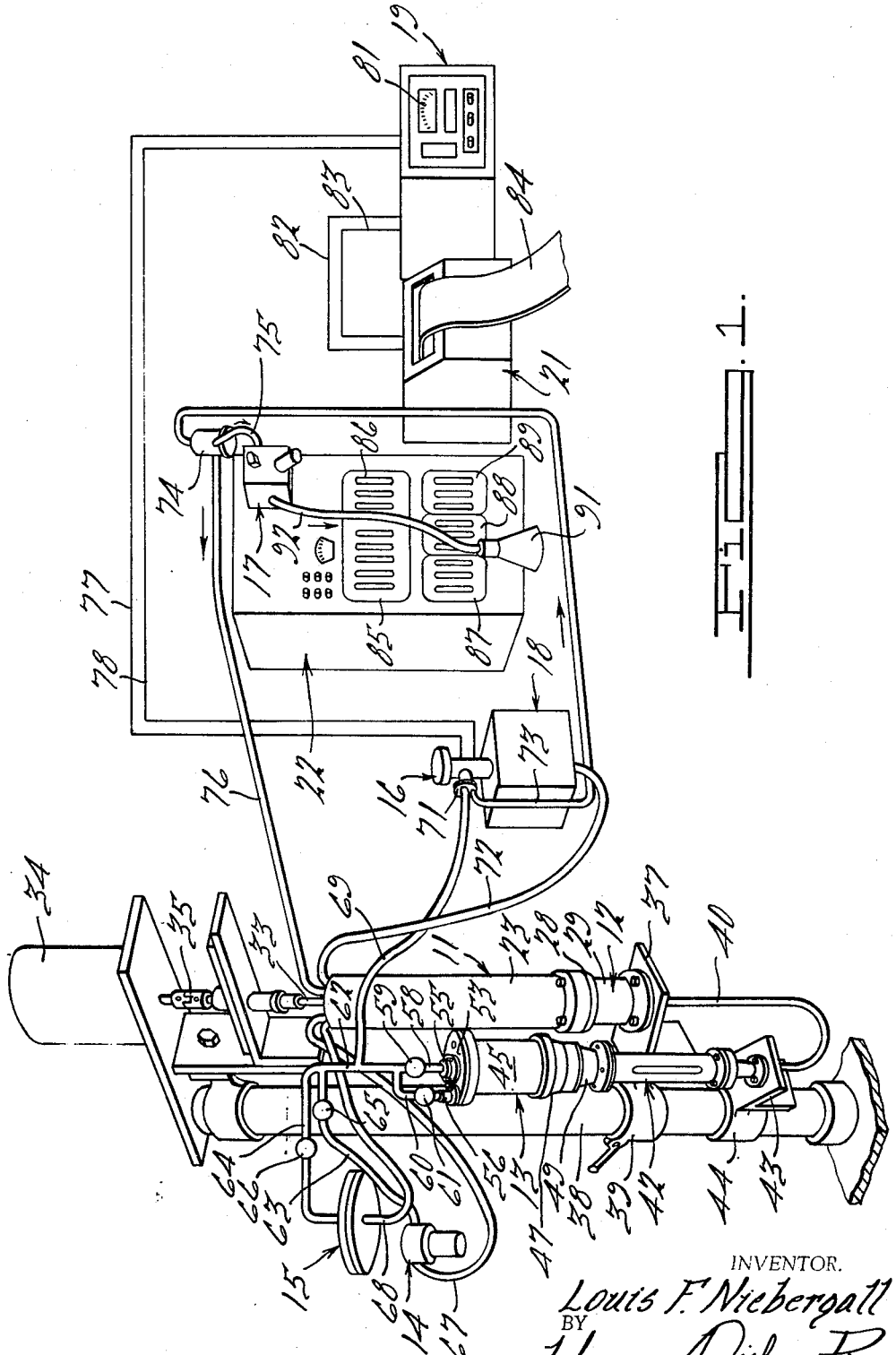
FIGURE 1 is a perspective, partially schematic view of a test apparatus embodying this invention and adapted to perform a test method embodying the invention.

The test apparatus is illustrated in part schematically in FIGURE 1 and includes a reservoir or sump 11 to which the test fluid and foreign particles are added. A pump 12 is positioned at the lower end of the reservoir 11 for conveying the test fluid and entrained foreign particles to a filter that is contained within a filter test housing 13. From the filter test housing 13, the fluid under the pressure of the pump 12 may be passed to clean-up filters 14 and/or 15. In addition, the fluid that has passed through the filter test housing 13 may be passed through sensing stations 16 and/or 17. The station 16 is coupled to a sensing device 18 that transmits data to a control station 19. The control station 19 is also coupled to a graphic read-out device 21. The sensing station 17 is coupled to a counting and indicating station 22. Although the operation of the test apparatus and the elements previously noted will be described in more detail, generally the test apparatus is adapted to pass a test fluid through a filter contained within the test housing 13 and the sensing devices 16 and 17 to provide respectively a continuous count of the number of particles in the test fluid and the respective sizes of the particles.

Considering the apparatus now in more detail, the reservoir 11 is comprised of a cylindrical stand pipe 23 that is open at its upper end and which is sealingly engaged at its lower end with a coupling 24 having a converging throat 25 which forms a fluid inlet to the pump 12. The pump 12 is designed in such a manner that, even though it circulates a fluid containing abrasive particles, it will not introduce any foreign particles through wear to the test fluid. The pump 12 is comprised of a fixed sleeve 26 having a flange 27 at its upper end that is held in place between the coupling 24 and a flange 28 formed at one end of a cylindrical pump housing 29.

The sleeve 26 is formed with a spiral like grooved passage 31 in which a complementary impeller or pumping member 32 is supported. The impeller 32 is fixed to one end of a drive shaft 33 that extends vertically upwardly through the reservoir 11 and which is affixed at its upper end to an electrically operated drive motor 34 by means of a coupling 35. Rotation of the drive shaft 33 and impeller 32 causes fluid to be driven from the reservoir 11 through the throat 25 and discharged under pressure through a discharge opening 36 formed in a lower flange in the pump housing 29. The reservoir 11 and pump 12 are supported upon a pedestal 37 that is adjustably supported upon a stand member 38 by means of a clamp 39.

A fluid conduit 40 transmits the pressurized test fluid from the pump 12 to an inlet passage 41 of a fluid flow meter indicated generally by the reference numeral 42. The flow meter 42 is supported upon a pedestal 43 that is also adjustably carried by the stand member 38 by means of a clamp 44. The flow meter 42 may be of any known type.

The filter test housing 13 is comprised of a generally cylindrical shell 45 that defines a cylindrical filter test cavity 46. The shell 45 is affixed to an upwardly diverging housing section 47 that defines a conical section 48 of a fluid inlet passage. The upper end of the section 48 is of slightly larger diameter than the adjacent end of the filter test cavity 46 and defines a substantially smooth continuous wall with this cavity. An inlet fitting 49 is affixed at its upper end to the lower end of the housing section 47, as by bolts or the like 51. The inlet fitting 49 is also formed with a conical section 52 of the fluid inlet passage for the filter test housing 13. The larger diameter end of the section 52 is slightly larger than the smaller diameter end of the section 48, but these sections form a substantially continuous, relatively smooth wall flow section. The construction thus described insures that foreign particles entrained in the test fluid cannot settle out within the sections 48 and 52 or within the filter test cavity 46. Said another way, any foreign particle that so tends to separate from the fluid will be redirected into the stream of flow of the test fluid by the funnel shape of the inlet sections 48 and 52.

Figure 2:
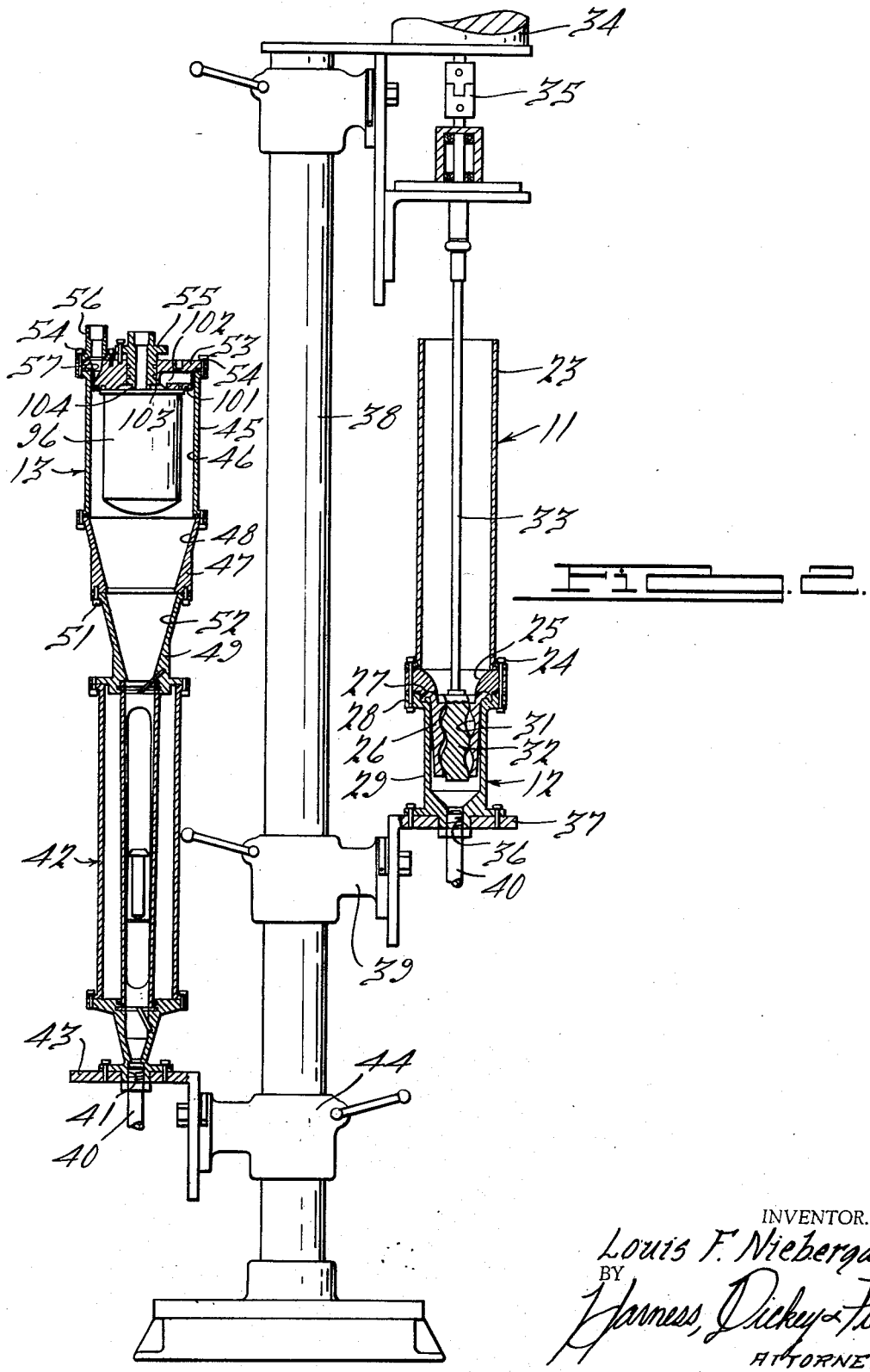
FIGURE 2 is an enlarged view, with portions shown in section of the test apparatus of FIGURE 1.

The filter test housing 13 is constructed in such a way that a number of different types of fluid filters may be positioned in the filter test cavity 46 in the path of fluid flow through this cavity. These constructions will be described in more detail as this description proceeds. In each embodiment, however, a test head, indicated by the reference numeral 53 in the embodiment shown in FIGURE 2, is fixed to and closes the upper end of the housing 45 by means of bolts or the like 54. The test head 53 accommodates a first fluid outlet fitting 55 that is adapted to register with the fluid outlet side of the filter being tested as will also become more apparent as this description proceeds. In addition, a by-pass outlet fitting 56 is accommodated by the test head which registers with an outlet passage 57 formed in the test head 53 and communicating directly with the filter test cavity 46.

A conduit 58 in which a valve 59 is positioned extends from the outlet fitting 55 and a like conduit 60 in which a valve 61 is provided extends from the by-pass outlet fitting 56. The conduits 58 and 60 join at a conduit 62 from which branch conduits 63 and 64 extend to the clean-up filters 14 and 15, respectively. Valves 65 and 66 are positioned in the conduit 63 and 64, respectively, to control the flow through these conduits. Conduits 67 and 68 extend from the clean-up filters 14 and 15, respectively, back to the upper end of the reservoir 11. A conduit 69 also extends from the conduit 62 to an inlet fitting 71 of the sensing station 16. The inlet fitting 71 splits the flow from the conduit 69 so that a portion of this flow passes through the sensing station 16 and its associated sensing device 18 and is returned to the reservoir 11 through a return conduit 72. The remaining portion of the flow from the conduit 69 passes through a conduit 73 to a spill block 74. The spill block 74 delivers a portion of the fluid it receives to the sensing station 17 through a conduit 75 and returns the remainder of the flow to the reservoir 11 via a conduit 76.

The sensing station 16 and its associated sensing device 18 is of a type that visually scans the fluid by passing it between two opposed beams of light. As a particle passes between these beams, the light is scattered and is converted into an electrical signal by the device 18 which is electrically coupled, as schematically indicated at 77 and 78 to the control station 19 wherein a signal is indicated on its dial 81 that is representative of the magnitude or ratio of foreign particles in the test fluid. In addition, the control station 19 is electrically coupled as indicated schematically at 82 and 83 to the graphic read-out device 21 to provide a continuous reading or graph on a tape 84.

The sensing station 17 and its associated particle counter 22 counts the number of particles in the fluid, sizes the particles and tallies the number of particles in given size ranges. This unit operates by passing a light beam of an exact size through the fluid and onto a multiplier phototube. Each foreign particle in the fluid stream interrupts a portion of the light beam in proportion to its size and causes a pulse in the phototube output signal that is proportionate to the size of the particle. In the depicted embodiment, the number of particles in five different size groups are indicated on respective counters 85, 86, 87, 88 and 89. After the particles have been counted they are delivered from the sensing station 17 to a beaker 91 by means of a conduit 92.

OPERATION AND TEST PROCEDURE

In operation, a test fluid of any known type normally used for testing filters is charged into the system with the reservoir 11 being substantially filled. The valve 59 is closed, the valve 61 is opened and one or both of the valves 65 and 66 are opened. The pump 12 is operated by driving the electric motor 34 that is connected to a suitable source of electrical current in any known manner.

This causes the test fluid to be circulated from the reservoir 11 through the conduit 40 into the filter test cavity 46 wherein a filter to be tested, indicated generally by the reference numeral 96, has been previously positioned. Since the valve 59 is closed all of the fluid flow will pass through the by-pass outlet passage 57 and by-pass outlet fitting 56, and there will be no flow through the filter 96. A portion of this fluid is delivered by the conduits 60, 62, 63 and 64 to the clean-up filters 14 and 15. These filters may be of any known type that are capable of removing substantially all particles from the test fluid. For this reason, the filter 15 may be a membrane filter which filter is capable of excluding extremely small particles from a fluid. The filtered fluid is returned to the reservoir 11 by the conduits 67 and 68. A portion of the fluid also flows from the conduit 62 to the sensing station 16 via the conduit 69. The sensing station 16 and its associated sensing device 18 transmit a signal to the control station 19 and read-out device 21 to indicate that particles are being removed from the test fluid, if any particles were in fact previously present. In addition, the sensing station 17 receives fluid via the conduit 73 so that the particle counter 22 will also give a reading of the number and size of particles in the fluid. This operation is continued until the respective sensing units 16 and 17 indicate that substantially no foreign particles are present in the test fluid, or until the level of contamination of the test fluid in the system is below a given base line value.

The clean-up filters 14 and 15 are incapable of removing all particles from the test fluid. They will, however, remove all particles of a size large enough to be sensed by the sensing station 17 and recorded by the indicating station 22. There may, however, be a certain number of particles smaller than this size present in the test fluid, which particles will be counted by the sensing device 16. In order to insure the uniform base line so that accurate comparisons may be made between different filters, the level of contaminants in the test fluid is subsequently raised in the manner now to be described. The valves 65 and 66 are closed while the by-pass valve 62 remains open. Continued operation of the pump 12 will cause circulation of the test fluid from the reservoir 11 through the filter test housing 13, sensing stations 16 and 17 and back to the reservoir 11. Oil with an additive is then added to the reservoir 11 on a drop-by-drop basis. The additives in the oil will be sensed as particles by the sensing device 16 and sufficient drops are added to bring the particle count up to the desired base line. For example, ten particles may be considered to be base line. The sensing station 17 will not count the additive drops as particles due to its design. Hence, the addition of the additive containing oil to the test fluid will not compromise the operation of the sensing station 17 and its associated indicating station 22.

After the base line condition has been reached, foreign particles are added to the test fluid, the number and type of particles being determined by the test to be run. In one standard test, a slurry consisting of 22 milligrams of A.C. Fine Dust wetted with Oliec Acid is added to the reservoir 11 until the strip chart 84 indicates a desired contaminant level. The A.C. Fine Dust is a test contaminant that is made up of a mixture of particles of different sizes. Circulation of the test fluid containing this contaminant is continued so that the operator can assure himself that the contaminants have been equally distributed throughout the test fluid and that the contaminant level is constant. The test fluid and entrained foreign particles are then passed through the filter to be tested 96 by opening the valve 59. The flow rate through the filter 96 is maintained at a rate of three (3) gallons per minute during the initial test procedure. The sensing stations 16 and 17 indicate the contaminant level instantaneously during the test period. A small amount of test fluid is drawn off from the sensing station 17 through the conduit 92 into the beaker 91. Initially the graphic read-out device 21 may be driven at a relatively rapid rate, for example, at a rate wherein the strip chart 84 passes by the recording pen at about ¾ inch a minute. After about twelve (12) minutes the strip chart speed is slowed to about six (6) inches per hour and the test continues to run for a period of fifteen (15) minutes. After fifteen (15) minutes, the flow rate through the filter 96 is increased to six (6) gallons per minute by increasing the driving speed of the motor 34. This has the effect of forcing some particles, which have previously been entrapped in the filter 96, from within the filter. The flow rate is then again slowed to three (3) gallons per minute until the end of the test period. The strip chart 84 and data recorded at various time intervals from the counters 85, 86, 87, 88 and 89 then indicate the efficiency of the filter element 96 as well as its efficiency in removing particles of varying sizes. It is to be understood that the aforedescribed test procedure is exemplary only of one test method that may be employed with this apparatus and that various other changes and modifications will suggest themself to those skilled in the art.

It has been previously noted that the filter test housing 13 is designed in such a way that varying types of fluid filters may be tested. FIGURE 2 shows the test housing 13 set up to test a conventional throw-away type oil filter 96. In this embodiment, the test head 53 is formed with a projecting section 101 that is adapted to engage the end cap of the filter. A fluid inlet passage 102 is formed in the section 101 that enters into an annular cavity 103 formed around a threaded extension 104 of the outlet fitting 55. The fluid outlet passage of the filter 96 is threaded onto the extension 104 and an O-ring seal (not shown) is positioned around the periphery of the cavity 103 so that the test fluid will flow through the filter element 96 in the same direction as is normal in this type of filter.

FIGURE 3 illustrates the filter test housing 13 set up to take another type of filter. In this case, the filter 121 is of the pleated paper type. The filter 121 has a longitudinally extending pleated paper filter media 122 that defines a central flow passage 123. An end cap 124 extends across the lower end of the media 121 and forms a closure for the adjacent end of the flow passage 123. An end cap 125 extends across the opposite end of the pleated media 122 and terminates in a female threaded fitting 126 that is in registry with the passage 123.

In this embodiment the test head, indicated generally by the reference numeral 127, also has a by-pass outlet fitting 56 of the type previously described. The test head 127 carries an annular seal 128 that is held in sealing engagement with the test housing shell 45 by threaded fasteners 129. A cylindrical bore 131 is formed centrally in the test head 129 in which a portion of the outlet fitting 55 is received. O-ring seals 132 and 133 sealingly engage the bore 131 and fitting 55 to insure a fluid tight connection. A male threaded fitting 134 is supported at the lower end of the outlet fitting 55 and receives the female threaded fitting 126 of the filter end cap. An annular seal 135 is interposed between the end cap 125 and a lower face 136 of the test head 127. A number of annular seals 137 are also received in circumferential grooves 138 formed in the test head 127 to insure against fluid leakage. When the filter 121 is received in the filter test housing 13 in the manner described, the test fluid passes radially through the pleated paper media 122 into the central passage 123 and out the outlet fitting 55.

FIGURE 4 illustrates the test housing 13 set up to take another type of filter element. In this embodiment the filter element 141 is of the pleated paper type and is comprised of an annulus of pleated paper 142 that defines a central flow passage 143. Opposite ends of the media 142 are sealingly engaged by end caps 144 and 145, respectively. Unlike the previously described embodiment, the end caps 144 and 145 do not, however, close either end of the central passage 143. A coupling member 155 is threaded onto the male threaded fitting 134 and receives a threaded end of an elongated stud 146. The opposite end of the stud 146 is formed with an enlarged head 147 that sealingly engages the end cap 145 to form a closure for the adjacent end of the central flow passage 143. The stud 146 also holds the end cap 144 in sealing engagement with an O-ring seal 148 interposed between the end cap 144 and the test head 127. In order to provide for discharge flow from the filter 141, the stud 146 is formed with a coaxial bore 151 that is intersected by a transverse bore 152 that opens into the central flow passage 143. It should be readily apparent that in this embodiment the test fluid will also flow radially inwardly through the filter media 141.

While it will be apparent that the preferred embodiments of the invention disclosed are well calculated to fulfill the objects above stated, it will be appreciated that the invention is susceptible to modification, variation and change.

What is claimed is:

1. The method of testing a fluid filter comprising the steps of passing a test fluid containing foreign particles through a filter to be tested, counting the number of foreign particles in the test fluid before the test fluid and particles are passed through the filter, and counting the number of foreign particles in the test fluid after it has passed through the filter to determine the number of particles removed from the test fluid by the filter.

2. The method as set forth in claim 1 further including the step of measuring the size of the foreign particles in the test fluid before the test fluid is passed through the filter and measuring the size of the particles remaining in the test fluid after the fluid has passed through the filter to determine the size of the particles removed by the filter.

3. The method as set forth in claim 2 wherein the number of the particles within given ranges of size is counted.

4. The method as set forth in claim 2 further including the step of recirculating the test fluid and entrained foreign particles through the filter for a given time period and continuously counting the number of foreign particles in the test fluid and measuring the size of the particles.

5. The method as set forth in claim 1 comprising the further step of passing the test fluid through a fine filter prior to passing the test fluid through the filter to be tested for removing foreign particles from the test fluid at least to a predetermined base line level and subsequently adding a predetermined amount of foreign particles to the test fluid prior to passing the test fluid through the filter to be tested.

6. The method as set forth in claim 5 further including the steps of counting the number of the particles in the test fluid above a predetermined minimum size before and after the test fluid is passed through the filter to be tested and adding a predetermined number of particles smaller than the minimum size to the test fluid after it is passed through the fine filter to bring the level of contaminants up to the predetermined base line.

7. A filter test apparatus comprising a reservoir adapted to receive a test fluid and entrained foreign particles, a filter test housing for receiving a filter to be tested, said filter test housing defining fluid inlet passage means, fluid outlet passage means and means for directing fluid flow from said fluid inlet passage means to said fluid outlet passage means through the filter to be tested, pump means for conveying the test fluid from said reservoir to said fluid inlet passage means of said filter test housing, conduit means for returning the test fluid from said fluid outlet passage means of said filter test housing to said reservoir, counting means in said last named conduit means for counting the number of foreign particles in the test fluid, and foreign particle sensing means in said last named counting means for sensing the size of the foreign particles in the test fluid.

8. A filter test apparatus as set forth in claim 7 further including bypass fluid passage means in said filter test housing, first valve means positioned in the fluid outlet passage means of the filter test housing for controlling the flow of test fluid through the filter to be tested, second valve means in said bypass outlet passage means for controlling the flow of test fluid through said bypass outlet passage means, a fine filter capable of excluding particles smaller than the size of the particles removed by the filter to be tested, and conduit means extending from said bypass outlet passage means to said fine filter means and from said fine filter means to said reservoir.

9. A fluid filter test apparatus comprising housing means defining a filter test cavity, a fluid inlet passage entering into said filter test cavity for introducing a test fluid and entrained foreign particles into said filter test cavity, a fluid outlet passage extending from said filter test cavity for the discharge of test fluid from said filter discharge cavity, and head means for supporting a filter to be tested within said filter test cavity and in the path of fluid flow from said fluid inlet passage to said fluid outlet passage for the removal of foreign particles from the test fluid by the filter to be tested, at least one of said fluid passages being disposed vertically beneath said filter test cavity with the walls of said test cavity adjacent said one fluid passage and the walls of said one fluid passage defining a relatively smooth downwardly converging flow stream for precluding the settling of the entrained foreign particles out of the test fluid within said filter test apparatus for precluding a false indication of the number of foreign particles removed from the test fluid by the filter to be tested, said one fluid passage being the fluid inlet passage, the fluid outlet passage being disposed vertically above said fluid inlet passage.

10. A fluid filter test apparatus as set forth in claim 9 wherein the filter test cavity is cylindrical in shape and the one fluid passage has the shape of a conical segment.

11. A fluid filter test apparatus as set forth in claim 10 wherein the larger diameter end of the conical segment is juxtaposed to the filter test cavity and has a diameter at least equal to the diameter of the filter test cavity.

12. A fluid filter test apparatus as set forth in claim 9 wherein the head means closes one end of the filter test cavity, the fluid outlet passage being defined by said head means.

13. A fluid filter test apparatus as set forth in claim 12 wherein said head means is removable from said test cavity means and includes adapter means for receiving and mounting a filter to be tested.

References Cited

UNITED STATES PATENTS

| | | |
|---|---|---|
| 3,063,289 | 11/1962 | Moul _____ 73—61 |
| 3,093,998 | 6/1963 | Albertson et al. |
| 3,275,834 | 9/1966 | Stevens. |

OTHER REFERENCES

Gordon, E. S., et al., Electronic Instrumentation of a Device To Automatically Count and Size Particles in a Gas. In I.R.E. Transactions on Industrial Electronics, pp. 12–22, March 1956.

LOUIS R. PRINCE, Primary Examiner

J. W. ROSKOS, Assistant Examiner

U.S. Cl. X.R.

73—38, 61; 324—71; 356—102